G. G. LOBDELL.
LATHES FOR TURNING WHEELS AND AXLES.
No. 172,134. Patented Jan. 11, 1876.
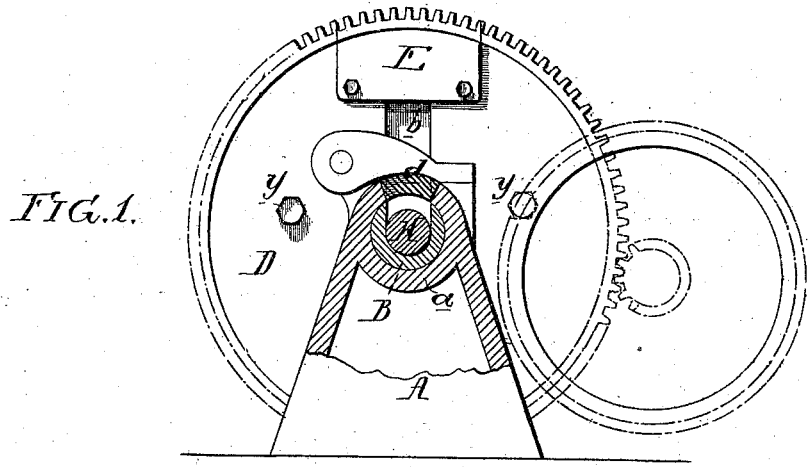
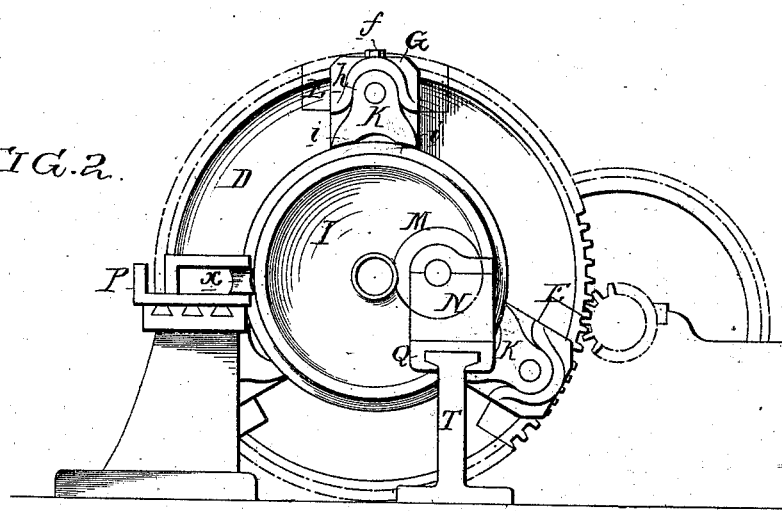
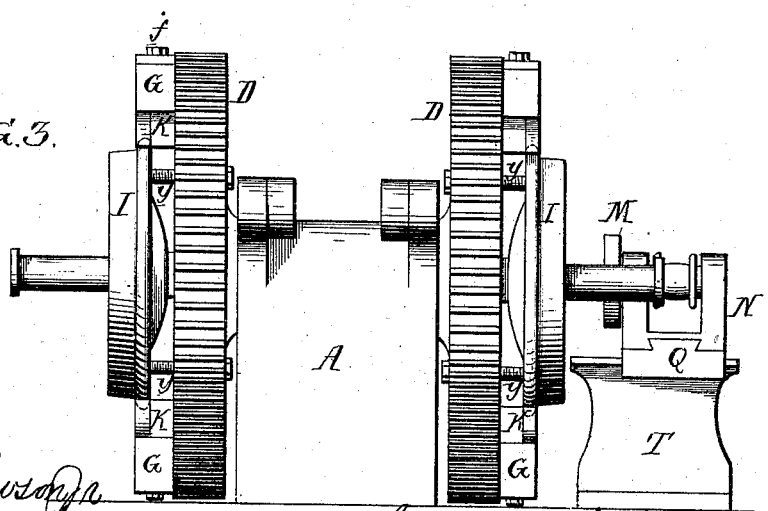

UNITED STATES PATENT OFFICE.

GEORGE G. LOBDELL, OF WILMINGTON, DELAWARE.

IMPROVEMENT IN LATHES FOR TURNING WHEELS AND AXLES.

Specification forming part of Letters Patent No. 172,134, dated January 11, 1876; application filed December 11, 1875.

*To all whom it may concern:*

Be it known that I, GEORGE G. LOBDELL, of Wilmington, Delaware, have invented a Lathe for Turning Wheels and Axles, of which the following is a specification:

The object of my invention is to so turn the wheels and axles of locomotives and cars that the concentricity of the journals of the axle in respect to the rim of the wheel shall be insured; a further object of my invention being to so construct the lathe that the turning of the rims of the chilled wheels may be accomplished without any jarring of the same. These objects I attain in the manner which I will now proceed to describe, reference being had to the accompanying drawing, in which—

Figure 1 is a vertical section of my improved lathe; Fig. 2, an end view of the same; and Fig. 3 a side view.

A is a substantial head-stock secured to a suitable base, the top of this head-stock consisting of a long bearing; or, if preferred, two bearings for the tubular shaft B, and to each end of this shaft is secured a large cog-wheel or face-plate, D, the two wheels being driven by any appropriate system of gearing. Each wheel has a slot, $b$, extending through the rim, and through the hub a detachable plate, E, which consists of a toothed segment of the wheel or face-plate, serving to close the slot. There is also a longitudinal slot in the bearing $a$, and this slot is closed by a plate, $d$, forming a continuation of the bearing hinged to the head-stock, and provided with lugs through which pass screws into the head-stock for securing the plate. The tubular shaft or lathe spindle B has also a longitudinal slot coinciding with those of the two wheels, so that when the slots of the spindle and wheels coincide with that of the bearing, and the segments E have been removed, and the hinged plate $d$ thrown back, the axle H can be lowered into the spindle without disturbing the flanged wheels I I, after which the segmental plates E and plate $d$ may be replaced, and properly secured. The slot may be in the side of the bearing or bearings $a$, so that instead of hoisting the axle and wheels and lowering them they may be rolled directly into their places. The axle H is chucked to the lathe through the medium of its flanged wheels, the axle itself being unsupported, excepting by the wheels, so that it cannot be subjected to any strain to which it would be liable if supported by centers on head-stocks in the usual manner.

The present manner of confining the flanged wheels to the cog-wheels will be best observed on reference to Fig. 2. On the face of each wheel D are three V-shaped guides, and to each guide is adapted a slide, G, which can be moved from or toward the center of the wheel by a screw, $f$. A dog, K, is loosely hinged to each slide, G, the upper rounded end of each dog being adapted to and bearing against a concave socket, $h$, on the said slide. Each dog has two legs, $i\,i$, which, in the present instance, are adapted to the flange of the car-wheel, against which all the slides are forced by the screws $f$, in doing which the dogs will so accommodate themselves to the said flanges that the two legs of each dog will have an equal bearing on the wheel; hence each car-wheel must be held from six points, and its security fully insured.

An important feature of my invention is the attachment of one of the griping-dogs of each wheel or face plate D to the detachable plate or segment E, for by making the dog removable with the plate the wheels I are set at liberty during the operation required to release the axle. After the car-wheels have been thus truly chucked to the cog-wheels, the latter are caused to revolve slowly, while a suitable tool, $x$, is applied to the chilled tread of each wheel, and the latter thereby truly turned, this tool being carried by a substantial slide-rest, P, secured to the base of the lathe. While the treads of the wheels are being thus turned, the journals of the axles may be ground by the emery-wheel or other grinding disk M, the spindle of which is caused to revolve in a carriage, N, the latter being adapted to guides on a slide, Q, which is adapted to guides on a standard, T, so that the said grinding-disk can be moved from or toward the journals, or traversed parallel with the same, thereby turning the journal, which must of necessity be concentric with the turned tread of the wheel. Three or more screws, $y$, may pass through each cog-wheel D, and bear against the flanged wheel, so as to insure the perfect steadiness of the latter. The retaining-dogs may be arranged for application to the hubs or other parts of the flanged wheels, and in some cases projections may be cast on the latter as bearings for the lugs, but, in all cases, whatever mediums for chucking be used, the power to turn the wheels must be transmitted directly to the same, and not to the axles.

I claim as my invention—

1. The combination of a lathe for turning wheels and axles with devices, substantially as described, whereby the wheels and axles may be chucked independently of the usual centers.

2. The combination, in a lathe for turning wheels and axles, of devices for chucking the wheels with mechanism for grinding the journals of the axles.

3. The combination of each wheel or face-plate D, with dogs K, self-accommodating to the wheels I, and slides G carrying the dogs, all substantially as specified.

4. The combination of the bearing a, tubular spindle B, and wheels D and the slots therein, with the detachable plates E and their griping-dogs, all substantially as set forth.

In testimony whereof I have signed my name to this specification in the presence of two subscribing witnesses.

GEORGE G. LOBDELL.

Witnesses:
HARRY HOWSON, Jr.,
HARRY SMITH.